US 6,722,718 B2

United States Patent
Brown et al.

(10) Patent No.: US 6,722,718 B2
(45) Date of Patent: Apr. 20, 2004

(54) LATCH MECHANISM FOR AN AUTOMOTIVE STORAGE COMPARTMENT

(75) Inventors: David A. Brown, Fenton, MI (US); Craig J. Longstreet, South Lyon, MI (US)

(73) Assignee: Intier Automotive Inc., Newmarket (CA)

( * ) Notice: Subject to any disclaimer, the term of this patent is extended or adjusted under 35 U.S.C. 154(b) by 0 days.

(21) Appl. No.: 10/245,210

(22) Filed: Sep. 16, 2002

(65) Prior Publication Data

US 2004/0051333 A1 Mar. 18, 2004

(51) Int. Cl.[7] .................................................. B60R 7/06
(52) U.S. Cl. ............... 296/37.12; 292/124; 292/DIG. 37
(58) Field of Search ........................... 296/37.1, 37.8, 296/37.12; 292/95, 96, 98, 99, 122, 123, 124, DIG. 14, DIG. 37

(56) References Cited

U.S. PATENT DOCUMENTS

| 1,479,559 | A | * | 1/1924 | Stair ........................... 292/198 |
| 2,136,662 | A | * | 11/1938 | Anderson .................... 292/64 |
| 2,325,225 | A | * | 7/1943 | Burke ......................... 292/123 |
| 2,337,894 | A | * | 12/1943 | Jacobi ........................ 292/227 |
| 4,074,786 | A | | 2/1978 | Joubert |
| 4,159,137 | A | * | 6/1979 | Richter ....................... 292/123 |
| 4,453,760 | A | | 6/1984 | Hira |
| 4,494,806 | A | | 1/1985 | Williams |
| 4,645,157 | A | | 2/1987 | Parker |
| 4,712,845 | A | | 12/1987 | Nicol |
| 4,812,604 | A | | 3/1989 | Howard |
| 4,865,398 | A | * | 9/1989 | Takeuchi et al. .......... 303/115.1 |
| 4,875,724 | A | * | 10/1989 | Gruber ........................ 292/216 |
| 5,050,922 | A | | 9/1991 | Falcoff |
| 5,072,983 | A | | 12/1991 | Muroi et al. |
| 5,150,933 | A | * | 9/1992 | Myslicki et al. ........... 292/216 |
| 5,342,102 | A | | 8/1994 | Takimoto |
| 5,388,901 | A | | 2/1995 | Asano |
| 5,570,915 | A | * | 11/1996 | Asadurian ................... 292/242 |
| 5,785,362 | A | * | 7/1998 | Nadherny .................... 292/98 |
| 5,816,630 | A | | 10/1998 | Bennett et al. |
| 5,823,612 | A | | 10/1998 | Angelo |
| 5,887,930 | A | | 3/1999 | Klein |
| 5,967,594 | A | | 10/1999 | Ramanujam |
| 5,975,594 | A | | 11/1999 | Sandhu et al. |
| 6,062,623 | A | | 5/2000 | Lemmen |
| 6,120,077 | A | | 9/2000 | Westphal et al. |
| 6,134,116 | A | | 10/2000 | Hoss et al. |
| 6,135,530 | A | | 10/2000 | Blaszczak et al. |
| 6,152,512 | A | | 11/2000 | Brown et al. |
| 6,164,711 | A | | 12/2000 | Neal et al. |
| 6,180,212 | B1 | * | 1/2001 | Single et al. ............... 428/192 |
| 6,276,737 | B1 | | 8/2001 | Cansfield et al. |
| 6,499,788 | B2 | * | 12/2002 | Ito et al. ..................... 296/70 |
| 2002/0158474 | A1 | * | 10/2002 | Cowper ....................... 292/194 |

\* cited by examiner

*Primary Examiner*—D. Glenn Dayoan
*Assistant Examiner*—Patricia L. Engle
(74) *Attorney, Agent, or Firm*—Rader, Fishman & Grauer PLLC

(57) ABSTRACT

A latch mechanism for an automotive storage compartment includes a release button, a pair of arm members operatively coupled to the release button, a first cam surface disposed between the arm members, a pivotally-mounted cam member including a second cam surface capable of engaging the first cam surface, and a torsion spring including first and second legs. The first leg contacts one of the arm members and the second leg contacts the cam member. Movement of the release button from a first position to a second position causes of the cam member to pivot in a first direction, and movement of the release button from the second position to the first position causes the cam member to pivot in a second direction. It is emphasized that this abstract is provided to comply with the rules requiring an abstract that will allow a searcher or other reader to quickly ascertain the subject matter of the technical disclosure. It is submitted with the understanding that it will not be used to interpret or limit the scope or meaning of the claims.

19 Claims, 4 Drawing Sheets

LATCH MECHANISM FOR AN AUTOMOTIVE STORAGE COMPARTMENT

BACKGROUND OF THE INVENTION

1. Field of the Invention

The invention relates generally to a latch mechanism for automobile closures, and in particular to a latch mechanism for a glove box compartment of a vehicle.

2. Description of the Related Art

Typically, a glove box for an automobile includes a housing that is connectable to the console or instrument panel of the vehicle, a door panel connected to the housing for movement between an opened position and a closed position, and a latch mechanism for releasably securing the closed door to the housing. The door panel and latch assemblies are separately manufactured and secured to one another in a separate assembly process.

Commonly available glove boxes include a handle operatively coupled to a latch mechanism to selectively move the latch mechanism between a locked and unlocked position. The latch mechanism in turn commonly includes a striker that is engageable with the housing in the locked position and an actuating member such as a rod that interconnects the striker to the handle. Assembly of the handle, latch mechanism, rod, and striker to the glove box door panel is commonly achieved through the use of fasteners. However, prior to fastening, each element must be precisely positioned relative to the door panel and housing.

Proper operation of the glove box will occur only if each of these separate components are precisely positioned and securely fastened to one another. Deviations in positioning cause numerous aesthetic concerns including undesirable gaps between the panel and housing and operational problems such as binding or excessive play between latched elements. Problems with the fit of glove box components most commonly manifest themselves in annoying rattles or squeaks. Moreover, fasteners common in the art generally develop additional play over time. This problem is especially apparent when threaded connectors engage plastic parts. Accordingly, the initial positioning and fastening of the glove box elements as well as the movement of elements over time has proven to be a difficult problem to address, especially when the latch mechanism is unduly complex in construction.

Notwithstanding these difficulties, those in the art continue to manufacture glove box doors, latch assemblies, and handle assemblies for various reasons. Unfortunately, operational concerns of customers relating to ease of opening and closing of the glove box as well as noise abatement suffer as a result of the complexity of the latching mechanism.

Accordingly, the inventors of the present invention have perceived a need to develop a latching assembly for a glove box of relatively simple construction that addresses the operational concerns of customers relating to ease of opening and closing of the glove box, as well as noise abatement resulting of the interaction of the various elements.

SUMMARY OF THE INVENTION

In one embodiment of the invention, a latch mechanism for an automotive storage compartment comprises a release button, a pair of arm members operatively coupled to the release button, a first cam surface disposed between the arm members, a pivotally-mounted cam member including a second cam surface capable of engaging the first cam surface, and a torsion spring including first and second legs. The first leg contacts one of the arm members and the second leg contacts the cam member. Movement of the release button from a first position to a second position causes the cam member to pivot in a first direction, and movement of the release button from the second position to the first position causes the cam member to pivot in a second direction.

In another embodiment of the invention, a glove box assembly comprises a door pivotally mounted to a housing for movement between an opened position and a closed position, and a latch mechanism comprising a pair of arm members slidingly mounted to the housing by one or more support members, a first cam surface disposed between the arm members, a pivotally-mounted cam member including a second cam surface capable of engaging the first cam surface, and a torsion spring including first and second legs, the first leg contacting one of the arm members and the second leg contacting the cam member, wherein movement of a release button from a first position to a second position causes the cam member to pivot in a first direction, and wherein movement of the release button from the second position to the first position causes the cam member to pivot in a second direction.

In yet another embodiment of the invention, an automotive storage compartment assembly comprises a housing mounted into an opening in a dashboard of a vehicle, a door pivotally mounted to the housing for movement between an opened position and a closed position, and a latch mechanism comprising a pair of arm members slidingly mounted to the housing by one or more support members, a first cam surface disposed between the arm members, a pivotally-mounted cam member including a second cam surface capable of engaging the first cam surface, and a torsion spring including first and second legs, the first leg contacting one of the arm members and the second leg contacting the cam member, wherein movement of a release button from a first position to a second position causes the cam member to pivot in a first direction, and wherein movement of the release button from the second position to the first position causes the cam member to pivot in a second direction.

DESCRIPTION OF THE PREFERRED EMBODIMENT

Figure 1:
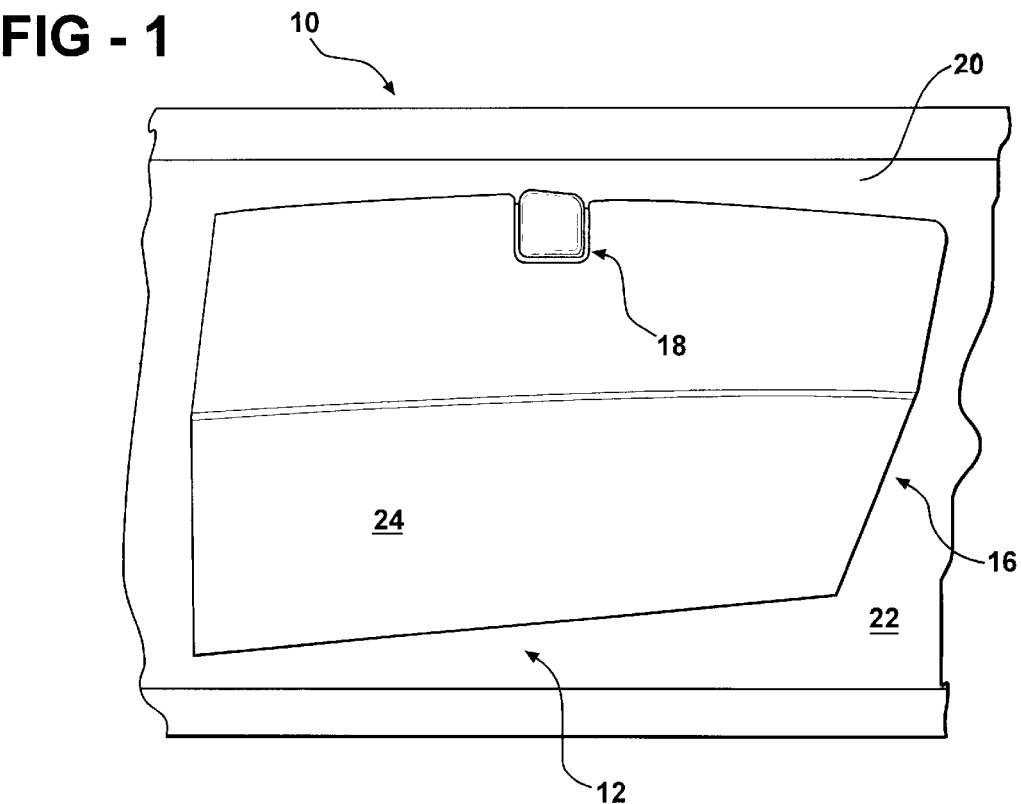
FIG. 1 shows a front view of the automotive storage compartment assembly, such as a glove box assembly, with a latch mechanism according to an embodiment of the invention.
Figure 2:
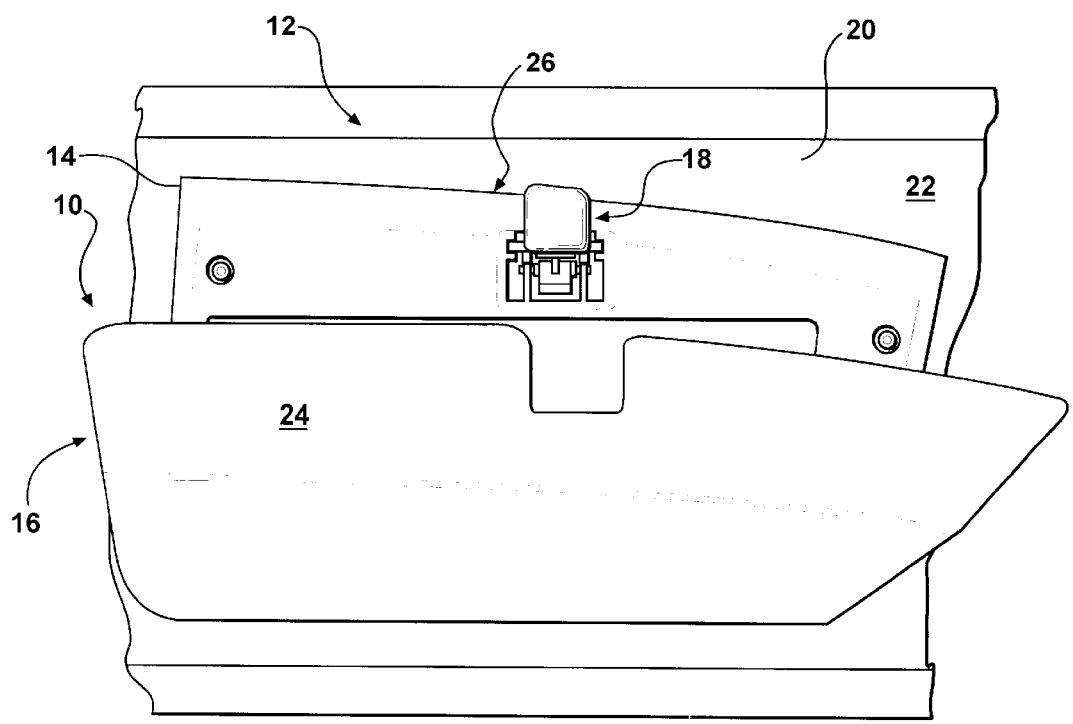
FIG. 2 shows a front view of a glove box of the glove box assembly of FIG. 1 is an opened position.

FIGS. 1–4 show an automotive storage compartment assembly 10, such as a glove box assembly, according to an embodiment of the invention. The glove box assembly 10 is mounted to a dashboard or a dash 12 at an opening 14. The glove box assembly 10 includes a glove box 16 that is secured in a closed position using a latch mechanism of the invention, shown generally at 18. In the illustrated embodiment, the dashboard and glove box assembly 10 is intended for use in a vehicle, such as an automobile. It should be understood that the inventive dashboard and glove box assembly 10 may be utilized in other suitable vehicles.

The dashboard 12 includes a dashboard outer surface 20 with a portion of the outer surface 20 defining a dash front surface area 22. The dashboard 12 may be constructed or formed from any suitable material. Preferably, the dashboard 12 is formed from a material which is durable, lightweight and strong enough to withstand the stresses expected in the operating environment. In addition, such material should be inexpensive and should be easily worked. Suitable materials include those materials which are normally used to form vehicle dashboards, such as thermoplastics or rigidified polymeric materials of a type well-known in the art.

Figure 3:
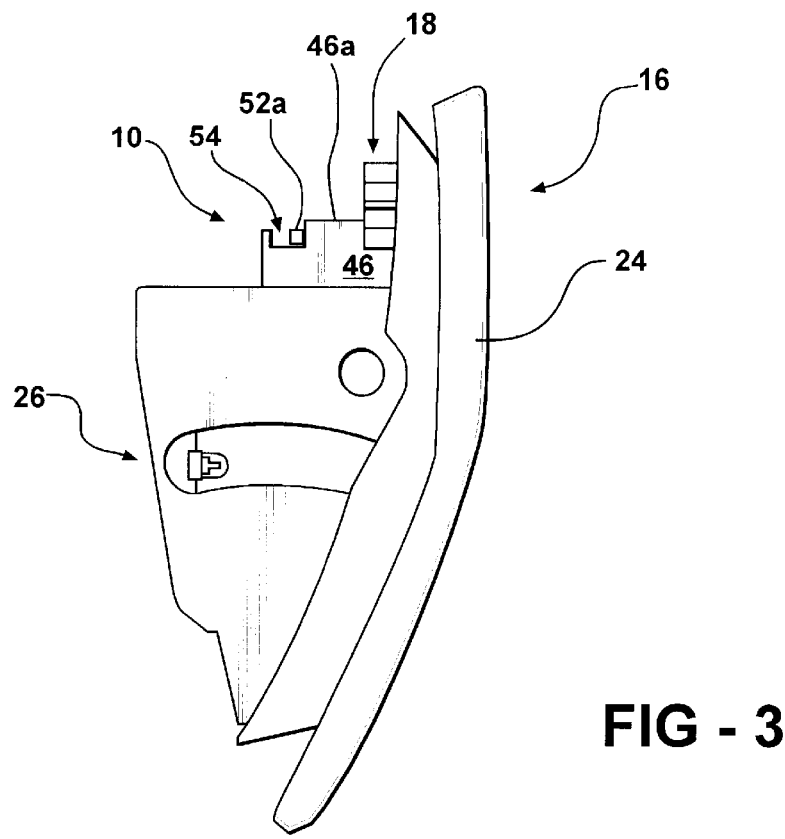
FIG. 3 shows a side elevational view of the glove box assembly of FIG. 1 when the glove box is in a closed position.
Figure 4:
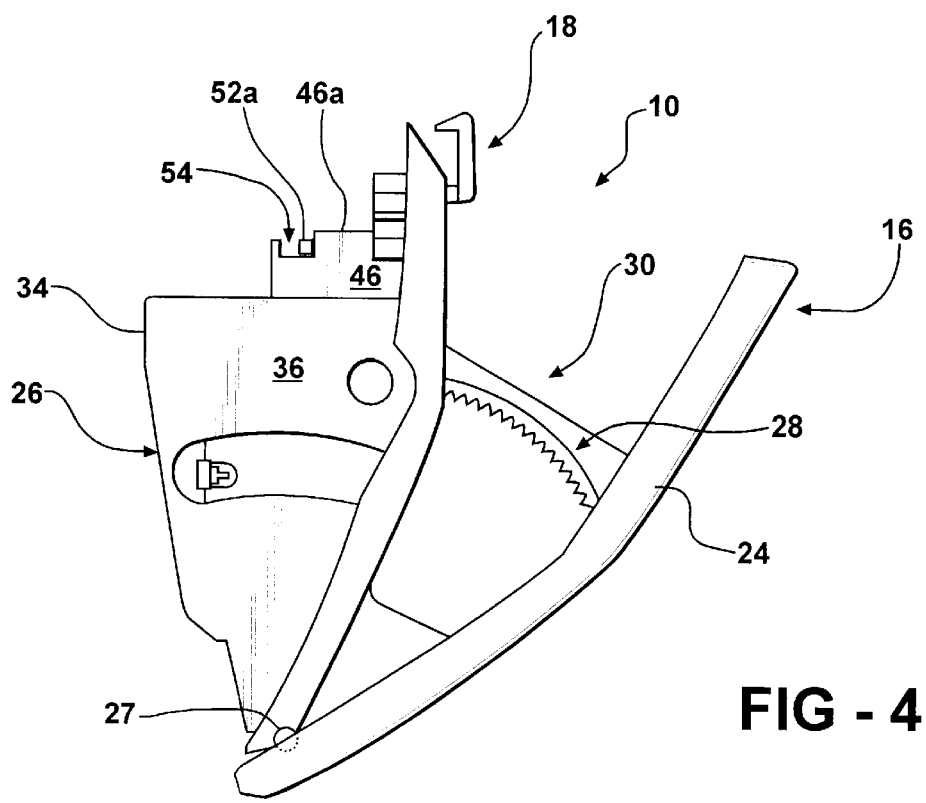
FIG. 4 shows a side elevational view of the glove box assembly of FIG. 1 when the glove box is in the opened position.

Referring now to FIGS. 3 and 4, the glove box 16 further includes a door 24 that is pivotally mounted to a housing 26 by one or more pivot pins 27. A plurality of walls 28 integrally formed with the door 24 define an enclosure 30 for holding articles, such as road maps, pens, pencils, vehicle registration papers, and other articles commonly held in a glove box 16. The glove box 16 is movable between an opened position, in which enclosure 30 may be accessed from the front of dashboard 12 (FIGS. 2 and 4), and a closed position in which enclosure 30 may not be accessed from the front of dashboard 12 (FIGS. 1 and 3). A torsion spring (not shown) may be provided around each pivot pin 27 to provide a biasing force to aid in the movement of the door 24 from the closed position to the open position.

Figure 5:
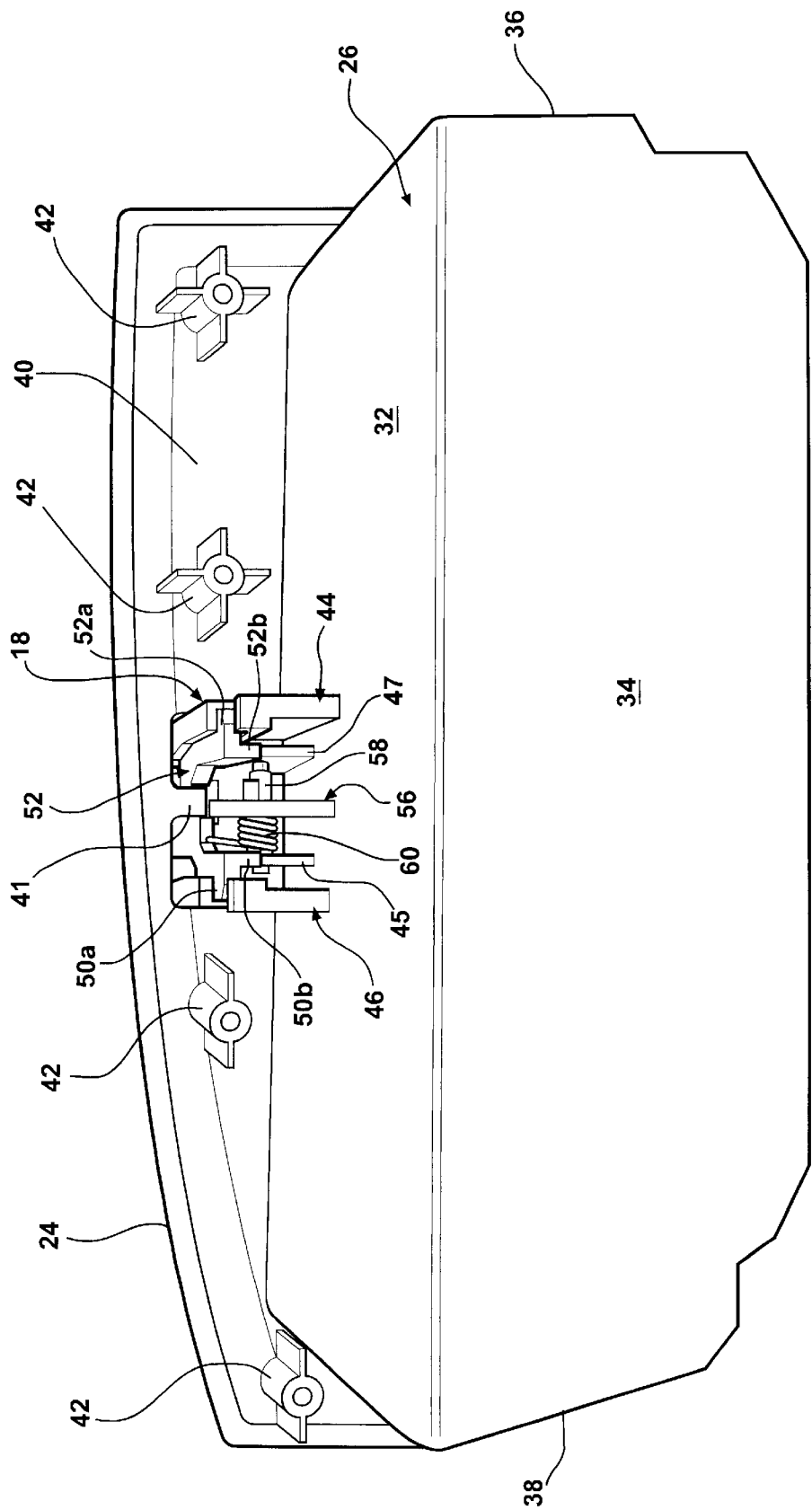
FIG. 5 shows a rear perspective view of the glove box assembly and the latch mechanism of the invention.
Figure 6:
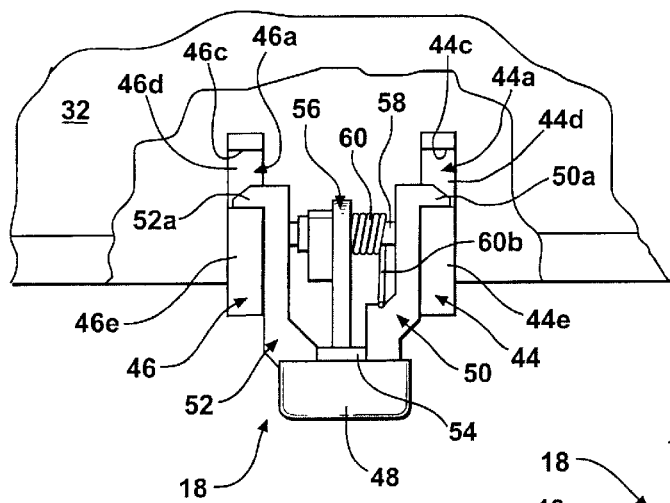
FIG. 6 is a partial cutaway top view of the latch mechanism of the invention.
Figure 7:
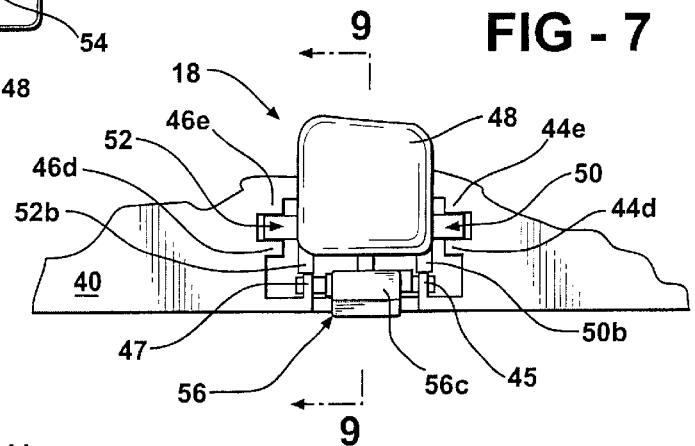
FIG. 7 is a partial cutaway front view of the latch mechanism of the invention.

As shown in FIG. 5, the housing 26 includes a top wall 32, a rear wall 34, a pair of side walls 36, 38 and a top flange portion 40. The top flange portion 40 may include a downwardly extending guide member 41 and one or more mounting members 42 for mounting the housing 26 to the front surface 22 of the dashboard 12. However, it will be appreciated that the invention is not limited by the location at which the latch mechanism 18 is mounted to the housing 26, and that the invention can be practiced by mounting the latch mechanism 18 at any desirable location of the glove box assembly 10 depending on the particular design of the glove box assembly 10.

Figure 8:
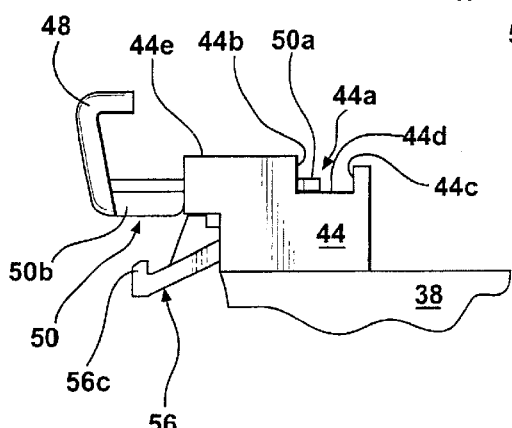
FIG. 8 is a partial cutaway side elevational view of the latch mechanism of the invention.

The housing 26 also includes a first pair of upright members or support members 44, 46 that extend between the top wall 32 and the top flange portion 40 of the housing 26. In addition, a second pair of upright members or support members 45, 47 extends from the top wall 32 of the housing 26. The purpose of the support members 44–47 is described below. As best seen in FIGS. 3, 4, and 8, the top surface of each support member 44, 46 includes a cutout or recess 44a, 46a defined by a front wall 44b, 46b, a rear wall 44c, 46c, a bottom wall 44d, 46d, and a top wall 44e, 46e.

Referring now to FIGS. 6–9, the latch mechanism 18 includes a depressible actuator or release button 48, a pair of longitudinal arm members 50, 52 operatively coupled to the release button 48, and a cam surface 54 extending between the arm members 50, 52. The guide member 41 of the top flange portion 40 extends downwardly between each arm member 50, 52 to prevent side-to-side or lateral movement of the release button 48, particularly when the release button 48 is depressed or released. In addition, each arm member 50, 52 prevents side-to-side or lateral movement of the release button 48, and thus the guide member 41 can be eliminated from the design. Each arm member 50, 52 includes a downwardly extending flange portion 50b, 52b that mate with the support members 45, 47. In addition, each arm member 50, 52 include an outwardly extending end portion 50a, 52a, respectively, at the distal end from the release button 48.

In the illustrated embodiment, the distance between the bottom walls 44d, 46d and the top walls 44e, 46e is sufficient to allow each arm member 50, 52 to be slidably supported therebetween. Thus, the release button 48 moves linearly along the bottom walls 44d, 46d when depressed and released by the user. The front walls 44b, 46b, and the rear walls 44c, 46c act as a stop for preventing excessive linear movement of the arm members 50, 52 when sliding on the bottom walls 44d, 46d. Specifically, the end portions 50a, 52a of each arm member 50, 52 engage the front walls 44b, 46b as each arm member 50, 52 moves linearly in the direction of the front walls 44b, 46b. Similarly, the end portions 50a, 52a of each arm member 50, 52 engage the rear walls 44c, 46c as each arm member 50, 52 moves linearly in the direction of the rear walls 44c, 46c. In the illustrated embodiment, the arm members 50, 52 and the cam surface 54 are integrally formed with the release button 48. However, the arm members 50, 52 and the cam surface 54 can be separately formed and fastened to the release button 48.

A cam member 56 is pivotally mounted to the support members 45, 47 by a pivot pin 58. It should be noted that the mating engagement between the downwardly extending flange portion 50b, 52b and the second support members 45, 47 prevents the pivot pin 58 from being dislodged when mounted on the second support members 45, 47. The cam member 56 includes a cam surface 56a that is positioned at an angle 59 (FIG. 9) with respect to the cam surface 54. A biasing means 60, such as a torsion spring, is positioned around the pivot pin 58. The torsion spring 60 includes a pair of leg members 60a, 60b. One leg member 60a engages a bottom surface 56b of the cam surface 56, and the other leg member 60b engages one of the arm members 50, 52 to bias the cam surface 56a upward against the cam surface 54. The cam member 56 also includes a detent 56c at the end proximate the door 24 that can be partially received in a recess 24a formed at the appropriate location in the door 24 to secure the door 24 in the closed position. The cam member 56 also includes a stop 56d that abuts the top wall 32 of the housing 26 to prevent excessive pivoting movement of the cam member 56 from the bias force exerted by the torsion spring 60. Thus, the cam member 56 is substantially an L-shaped member that is pivotally mounted to the support members 45, 47 and biased by the torsion spring 60 such that the cam surface 56a engages the cam surface 54 and the stop 56d abuts the top wall 32 of the housing 26.

When the release button 48 is depressed and the door 24 of the glove box 16 is in the closed position, the arm members 50, 52 move linearly along the bottom walls 44d, 46d as the cam surface 54 engages the cam surface 56a. At the same time, the cam member 56 pivots about the pivot pin 58 and the detent 56c travels downward with respect to the recess 24a of the door 24. As the release button 48 is further depressed, the detent 56c continues to travel downward until the detent 56c is no longer received in the recess 24a. At this point, the door 24 can freely pivot about the pivot pin 58 to the opened position for access to the contents within the enclosure 30 by the user.

One aspect of the invention is the simplicity of its design. For example, as the cam member 56 is being pivoted by the cam surface 54, the leg members 60a, 60b of the torsion spring 60 are being moved further apart from each other, thereby increasing the biasing force exerted by the torsion spring 60 on the cam member 56. After the release button 48 is no longer depressed, the increased biasing force causes the cam member 56 to pivot in the opposite direction until the stop 56d engages the top wall 32 of the housing. The same biasing force also causes the arm members 50, 52 to linearly move in an opposite direction along the bottom walls 44d, 46d and return to its position before being depressed by the user. Thus, the simplicity of the design of the invention provides for biasing of both the release button 48 and the cam member 56.

Figure 9:
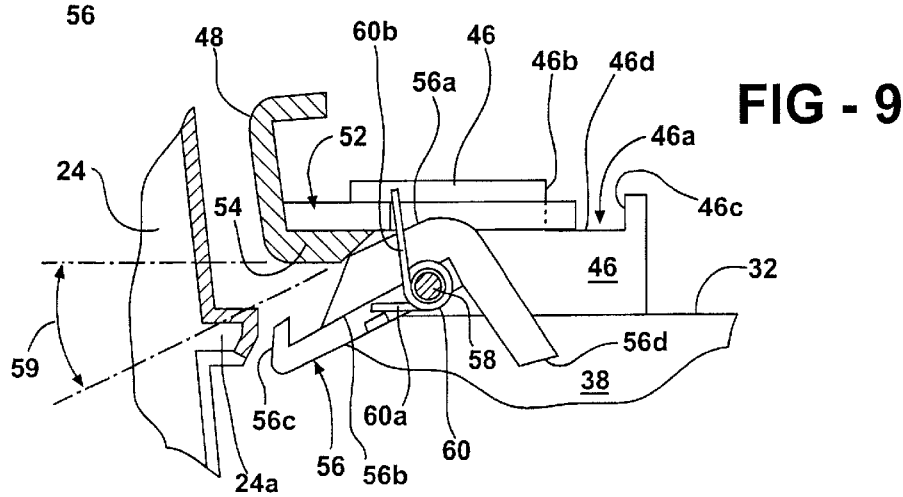
FIG. 9 is a cross sectional view of the latch mechanism of the invention taken along line 9—9. of FIG. 7.

To move the glove box 16 from the opened position to the closed position, the user urges the door 24 toward the latch mechanism 18 of the invention. As the door 24 engages the detent 56c, the door 24 causes the detent 56c of the cam member 56 to pivot in the downward direction. As shown in FIG. 9, the detent 56c and the portion of the door 24 that engages the detent 56c can both be suitably angled to allow the door 24 to easily pivot the detent 56c in the downward direction. Again, the downward travel of the detent 56c causes the biasing force exerted by the torsion spring 60 to increase as the leg members 60a, 60b move further apart from each other. As the user continues to urge the door 24 toward the latch mechanism 18, the biasing force from the torsion spring 60 urges the detent 56c into the recess 24a of the door 24, thereby placing the glove box 16 in the closed position.

While the invention has been specifically described in connection with certain specific embodiments thereof, it is to be understood that this is by way of illustration and not of limitation, and the scope of the appended claims should be construed as broadly as the prior art will permit.

What is claimed is:

1. A latch mechanism for an automotive storage compartment, comprising:
    a pair of arm members operatively coupled to a release button;
    a first cam surface disposed between the arm members;
    a pivotally-mounted cam member including a second cam surface capable of engaging the first cam surface; and
    a torsion spring including first and second legs, the first leg engaging one of the arm members and the second leg engaging the cam member,
    wherein movement of the release button from a first position to a second position causes the cam member to pivot in a first direction, and
    wherein movement of the release button from the second position to the first position causes the cam member to pivot in a second direction.

2. The latch mechanism according to claim 1, wherein a biasing force exerted by the torsion spring is increased when the cam member is pivoted in the first direction, and wherein the biasing force exerted by the torsion spring is decreased when the cam member is pivoted in the second direction.

3. The latch mechanism according to claim 1, wherein the cam member further includes a stop for preventing excessive pivoting movement of the cam member.

4. The latch mechanism according to claim 1, wherein the cam member is pivotally mounted on a pair of support members by a pivot pin.

5. The latch mechanism according to claim 4, wherein the arm members include a flange portion for mating engagement with the pair of support members for preventing the pivot pin from becoming dislodged when mounted on the support members.

6. The latch mechanism according to claim 1, wherein the pair of arm members are slidingly mounted on a pair of support members for linear movement thereon.

7. The latch mechanism according to claim 1, wherein each arm member includes an outwardly extending end portion for preventing excessive linear movement of each arm member.

8. A glove box assembly, comprising:
    a door pivotally mounted to a housing for movement between an opened position and a closed position; and
    a latch mechanism comprising a pair of arm members slidingly mounted to the housing by one or more support members, a first cam surface disposed between the arm members, a pivotally-mounted cam member including a second cam surface capable of engaging the first cam surface, and a torsion spring including first and second legs, the first leg engaging one of the arm members and the second leg engaging the cam member, wherein movement of a release button from a first position to a second position causes the cam member to pivot in a first direction, and wherein movement of the release button from the second position to the first position causes the cam member to pivot in a second direction.

9. The glove box assembly according to claim 8, wherein a biasing force exerted by the torsion spring is increased when the cam member is pivoted in the first direction, and wherein the biasing force exerted by the torsion spring is decreased when the cam member is pivoted in the second direction.

10. The glove box assembly according to claim 8, wherein the cam member further includes a stop for preventing excessive pivoting movement of the cam member.

11. The glove box assembly according to claim 8, wherein the cam member is pivotally mounted on a pair of support members by a pivot pin.

12. The glove box assembly according to claim 11, wherein the arm members include a flange portion for mating engagement with the pair of support members for preventing the pivot pin from becoming dislodged when mounted on the support members.

13. The glove box assembly according to claim 8, wherein each arm member includes an outwardly extending end portion for preventing excessive linear movement of each arm member.

14. An automotive storage compartment assembly, comprising:
    a housing mounted into an opening in a dashboard of a vehicle;
    a door pivotally mounted to the housing for movement between an opened position and a closed position; and
    a latch mechanism comprising a pair of arm members slidingly mounted to the housing by one or more support members, a first cam surface disposed between the arm members, a pivotally-mounted cam member including a second cam surface capable of engaging the first cam surface, and a torsion spring including first and second legs, the first leg engaging one of the arm members and the second leg engaging the cam member, wherein movement of a release button from a first position to a second position causes the cam member to pivot in a first direction, and wherein movement of the release button from the second position to the first position causes the cam member to pivot in a second direction.

15. The automotive storage compartment assembly according to claim 14, wherein a biasing force exerted by the torsion spring is increased when the cam member is pivoted in the first direction, and wherein the biasing force exerted by the torsion spring is decreased when the cam member is pivoted in the second direction.

16. The glove box assembly according to claim 14, wherein the cam member further includes a stop for preventing excessive pivoting movement of the cam member.

17. The glove box assembly according to claim 14, wherein the cam member is pivotally mounted on a pair of support members by a pivot pin.

18. The glove box assembly according to claim 17, wherein the arm members include a flange portion for mating engagement with the pair of support members for preventing the pivot pin from becoming dislodged when mounted on the support members.

19. The glove box assembly according to claim 14, wherein each arm member includes an outwardly extending end portion for preventing excessive linear movement of each arm member.

* * * * *